Figure 1:
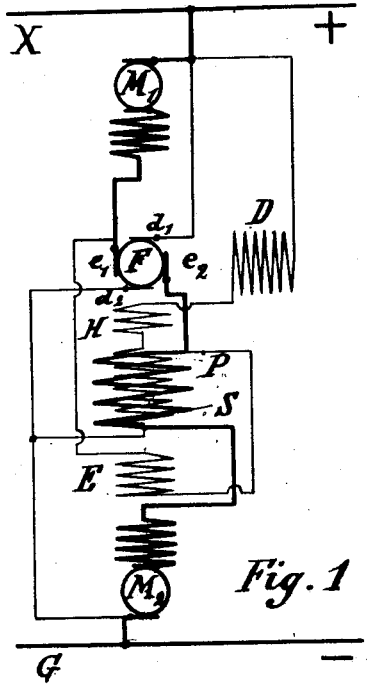

F. CUMONT.
ARRANGEMENT FOR STARTING AND REGULATING DIRECT CURRENT ELECTRIC MOTORS.
APPLICATION FILED DEC. 2, 1912.

1,185,485.

Patented May 30, 1916.
2 SHEETS—SHEET 1.

F. CUMONT.
ARRANGEMENT FOR STARTING AND REGULATING DIRECT CURRENT ELECTRIC MOTORS.
APPLICATION FILED DEC. 2, 1912.
1,185,485.
Patented May 30, 1916.
2 SHEETS—SHEET 2.
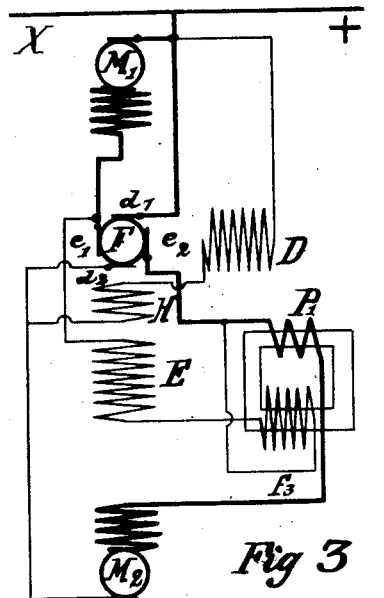
Fig. 3
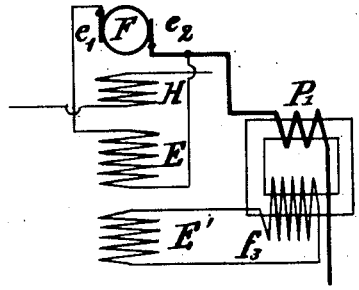
Fig. 4
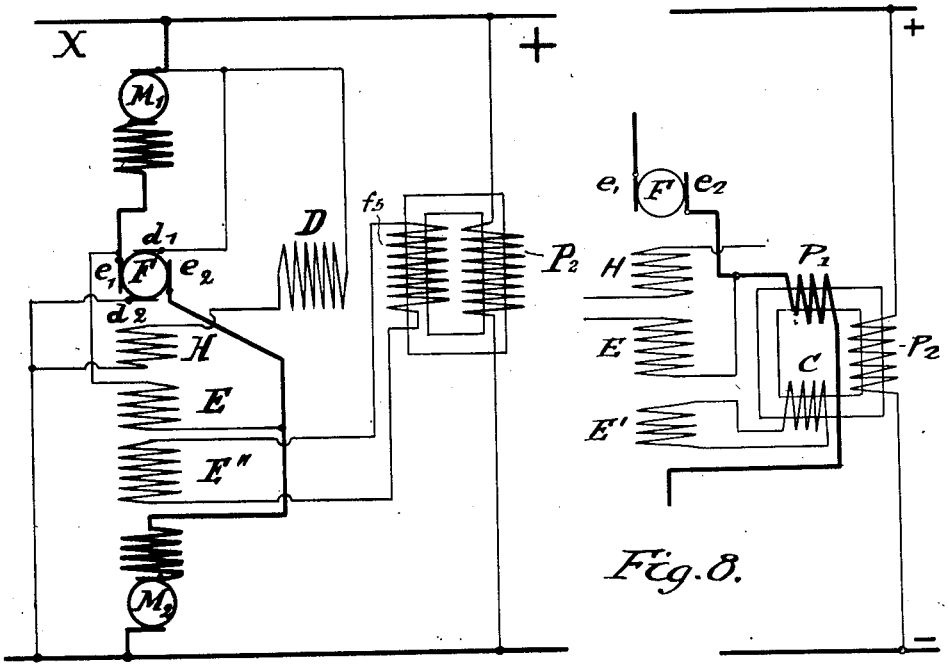
Fig. 6.
Fig. 8.

UNITED STATES PATENT OFFICE.

FERNAND CUMONT, OF PARIS, FRANCE, ASSIGNOR TO LA SOCIÉTÉ DITE S. T. A. R. (SYSTEME DE TRACTION AUTO-REGULATEUR), OF PARIS, FRANCE.

ARRANGEMENT FOR STARTING AND REGULATING DIRECT-CURRENT ELECTRIC MOTORS.

1,185,485.  Specification of Letters Patent.  Patented May 30, 1916.

Application filed December 2, 1912. Serial No. 734,542.

*To all whom it may concern:*

Be it known that I, FERNAND CUMONT, a citizen of the Republic of France, residing at Paris, in the Republic of France, have invented certain new and useful Improvements in Arrangements for Starting and Regulating Direct-Current Electric Motors, of which the following is a specification.

In my pending application Serial No. 702074, filed June 6, 1913, is described an invention comprising a combination of suitable means for obtaining automatically the starting at constant current and the speed regulation of a series motor, or of several series motors, the same means being in addition utilized in a suitable manner for regenerative braking for regulating the speed on down grades, for reducing this speed, or for producing the actual stoppage of the motor or motors. It is made evident by the description in the said application that if the phenomena of self-induction and the lag in the variation of a field flux relative to the variations of exciting current be disregarded, the automatic action of the system would be perfect, but these phenomena, during the braking, on account of the violence of the actions taking place, disturb this automatic action, and it is for the purpose of correcting these disturbing influences that arrangements for permitting satisfactory braking action have been devised and form the object of the present invention.

In order to indicate the scope of the invention several examples of devices for obtaining the desired object will be described, the accompanying drawings being utilized in this description. These drawings consist of diagrams similar to that forming the drawing of application Serial No. 702074, and show additional devices provided for the purposes above indicated.

Figure 2:
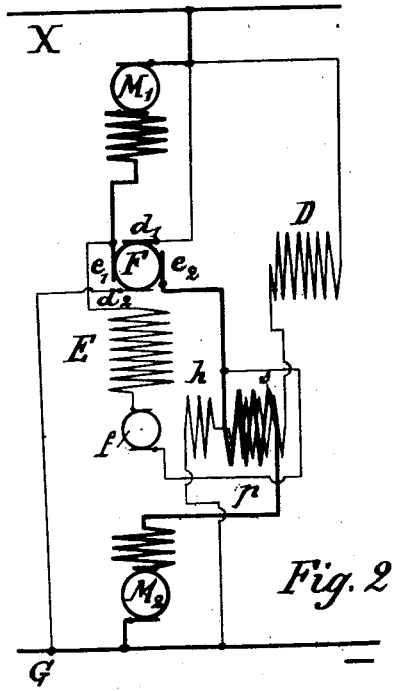
Figures 5, 7:
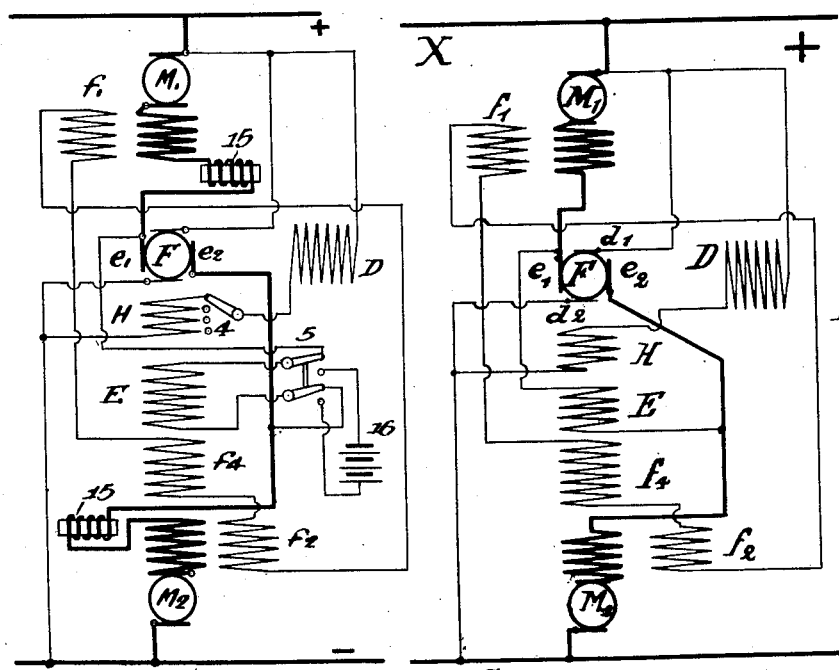

In the accompanying drawings:—Figure 1 shows one method of carrying out the invention employing two opposing windings on the field system of the regulator; Fig. 2 shows an arrangement as in Fig. 1, in which the constant winding of the regulator is replaced by a small exciter and the two opposing auxiliary windings with the constant excitation are placed on the field of this machine; Fig. 3 shows an arrangement in which a transformer action is employed; Fig. 4 shows a modification of the arrangement shown in Fig. 3; Fig. 5 shows an arrangement in which the transformer action takes place on the fields of the motors; Fig. 6 shows an arrangement in which a transformer is employed one of the windings being across the mains while the other is connected to a winding on the field system of the regulator; Fig. 7 shows a modified form of the arrangement of Fig. 5, in which certain features of the invention are combined. Fig. 8 shows a combination of the arrangements of Figs. 4 and 6.

The regulator F which corresponds to the machine described in my co-pending application Serial No. 737465, filed December 18", 1913, may be in the form of a single machine or two separate machines mechanically coupled together, one part serving to drive it at constant speed or act as a constant voltage generator indicated by brushes $d'$ $d^2$; this has a constant winding D and is similar to a shunt motor or generator across the mains X G. The other portion has two other windings H and E. H is constantly excited by means of current direct from the mains. The winding E is placed directly across the brushes $e'$ $e^2$, and serves as a shunt winding for the regulator. This excitation when the regulator is driven at a suitable speed serves to generate at the brushes $e'$ $e^2$ of the regulator an electromotive force which will balance at all times the E. M. F. applied to them, while the excitation $h$ serves to give a constant flux, thus permitting a constant current to flow through the machine dependent only on the resistance of the armature of the regulator and the degree of excitation of the winding H. By this means the motor in series with the regulator can be gradually started up to speeds corresponding to that for series or parallel running. It is essential for this arrangement to work satisfactorily that the winding E should always have a value sufficient to maintain at the terminals $e'$ $e^2$ the pressure applied to those terminals. This particularly applies during the establishment of braking and starting conditions. Now as the winding E has a large self-induction, this causes a lagging effect and due to this the current may rise to dangerous limits. In order to avoid these defects suitable self-induction coils 15

(Fig. 7) may be connected in series with the motors $M_1$ and $M_2$, which coils are without action on the field system of the apparatus F. These self-induction coils oppose the rise of current at the moment of the commencement of the braking action, and also resist any variation in the value of the current from the desired value when running conditions have been established, or more exactly render such variation sufficiently slow for the winding E to have time to produce its regulating action. Again it is possible to act on the field system of the rotary apparatus F not with the object of increasing the induced currents produced by the excitation of the field system, but with a view to diminishing them. For this object the field system of the apparatus F can be laminated.

The following examples will be described with reference to the Figs. 1 to 6.

1st example: In connection with this example reference is made to Fig. 1. Linked with the magnetic circuits of the machine $e_1$ F $e_2$, on which are mounted the field windings E and H, additional windings P and S are arranged, one of these, S, being traversed by the motor current, and the other, P, being in series with the winding H. It is pointed out that on the drawing the windings D, H and P are represented as being in series with each other, but it should be understood that the winding D could be fed separately from the windings H and P, and that even the two latter could be separated. In view of the result to be obtained, the ampere-turns of the winding P ought to be neutralized by the ampere-turns of the winding S under normal braking conditions. The winding P is arranged to act in such a direction that if it were acting alone it would induce in the machine $e_1$ F $e_2$ an electromotive force in opposition to that of the line. It is seen that if for any reason the current in the winding S decreases, the action of the winding P would preponderate and would give rise to a supplementary electro-motive force tending to increase the output from the circuit $M_1$ $M_2$ F to the line. On the contrary, if the current in the winding S increases its action would then preponderate and would produce an opposite result. By the combined action of the two windings the current is brought back to its initial value and at this moment the actions of the windings S and P neutralize.

In the preceding description it has been assumed that braking conditions have been established. At the moment of commencing the production of the braking current, before closing the circuit of the motors $M_1$ and $M_2$, the windings E, P and H only are in action. Accordingly the winding P would produce in the machine $e_1$ F $e_2$ an electromotive force considerably greater than that required to produce the normal output current without the assistance of the electromotive forces produced by the motors which have not yet come into action. In order to remove this disadvantage the winding P would be short-circuited. The motor circuit having been then closed, the action of the winding S would reduce the current sent out and would prevent this current from rising to an excess value. It is at this moment that the short-circuiting connection is removed from the winding P in order to obtain the current value required for the normal braking action.

2nd example: This example is illustrated by Fig. 2 of the drawings. In this case in place of the winding H a small auxiliary dynamo $f$, running at practically constant speed, is inserted in series with the winding E and gives an electro-motive force of suitable direction. By this means a supplementary excitation current is produced in the winding E with a coresponding supplementary electro-motive force in the machine $e_1$ F $e_2$, this electro-motive force being equal to that which would have been produced by the action of the winding H. As it is necessary that this electro-motive force should be of constant value, a field winding $h$ may be provided on the machine $f$ in series with the winding D, or fed independently. In order to obtain stability under braking conditions there may be added to the winding $h$ two windings $p$ and $s$, the first being traversed by a constant current which passes through the winding $h$, and the second being traversed by the current of the motors $M_1$ and $M_2$. The windings $p$ and $s$ may be mounted on the same magnetic circuit as the winding $h$, or upon a separate magnetic circuit. The ampere-turns produced by the winding $p$ will add to those produced by the winding $h$, while the ampere-turns of the winding $s$ are in opposition thereto.

In this example the windings $p$ and $s$ have an action comparable to the action of the windings P and S in the first example, and it is not considered necessary to reproduce here the observations made in connection with that example. It may be pointed out that the action of the small machine $f$, of which the field system may be laminated will be very rapid, for it will only have a small self-induction, and further, the windings can be easily arranged so that for small variations of current in the winding $s$, relatively great variations in the electro-motive force of the dynamo $f$ may be obtained. It will be recognized that in order to obtain an equally energetic action with the windings P and S above mentioned it would be necessary to make them of great size.

3rd example: In this connection Fig. 3 of the drawings is referred to. A transformer is provided having its heavy current winding $P_1$ traversed by the current of the motors $M_1$ and $M_2$, and the fine wire winding $f_3$ in series with the winding E. Under these conditions the windings P and $f_3$ are linked with a magnetic circuit namely the magnetic circuit of the transformer, which is absolutely independent of the apparatus F. When the current through the winding $P_1$ is constant in value, the winding $f_3$ has no action on the excitation of the apparatus F, but when this current varies, the winding $f_3$ produces a variation of the current in the winding E such as to produce in the machine $e_1$ F $e_2$ a variation in the electro-motive force, tending to produce in the circuit of the motors $M_1$ and $M_2$ a current in the opposite direction.

4th example: Since the automatic variation of the current in the winding E, in this example, influences the current in the windings $P_1$, it would be possible by way of variation to adopt the arrangement shown in Fig. 4 of the drawings, in which the action upon the field system of the apparatus F is effected by means of a separate winding $E'$.

5th example: In this connection reference is made to Fig. 5 of the drawings. In accordance with this example the field systems of the motors $M_1$ and $M_2$ are utilized as the transformers, additional fine wire windings $f_1$ $f_2$ being arranged thereon in such manner that the electro-motive forces induced in these two windings are always in the same direction. A winding $f_4$ connected in series with these windings $f_1$ $f_2$, is mounted on the machine F in such a manner that on a decrease (or an increase) of the braking current, a corresponding supplementary electro-motive force is produced in the machine $e_1$ F $e_2$ in opposition to (or in the same direction as) the line voltage, that is to say, tending to increase (or to diminish) the said braking current.

6th example: In the preceding examples, in order to counter-balance the current variations, phenomena due to these variations have been utilized. It is possible, however, to obtain the desired result by making use of the causes which produce these current variations. In this example use is made of one of these causes, namely, the variations of the voltage in the line. This example will be described by reference to Fig. 6 of the drawings. A transformer is employed having a magnetic circuit completely independent of the magnetic circuits of the motors $M_1$ and $M_2$, and of the apparatus F. This transformer comprises two windings, one of which $P_2$, is subjected to the line voltage, while the other, $f_5$, is in series with the field winding $E''$, so that its action is combined with that of the winding E in the machine $e_1$ F $e_2$. The windings $P_2$ and $f_5$ are arranged so that when the voltage of the line falls (or rises) the current induced in the winding $f_5$, and accordingly in the winding $E''$, gives rise to an electro-motive force in opposition to, (or in the same direction as) that of the line, that is to say, tending to increase (or to diminish) the braking current. It would be possible to connect the winding $f_5$ in series with the winding E, as in the 3rd example (Fig. 3), the windings E and $E''$ being combined.

In the preceding description each example has been assumed to be independent but it must be understood that, in order to render more perfect, the attainment of the desired result, it is allowable to combine two or more of these different examples. It is obvious that all possible combinations cannot be described here but as an example a number of the examples described above are shown combined in Figs. 5, 7 and 8. The different arrangements may be employed either separately, as previously described, or in conjunction.

Referring to Fig. 7 it will be seen that the regulator F is provided with five windings. The winding H whose constant excitation may be varied to any desired value by means of the switch 4 and the winding E being the same as in my co-pending application Serial No. 702074; while winding $f_4$ corresponds to the similar windings $E'$ in Fig. 4, $f_4$ in Fig. 5 and $E''$ in Fig. 6. It will be obvious that Fig. 7 shows an arrangement whereby example 5 may be combined with the use of the self-induction coils.

The combination of the arrangements set forth in the fourth and sixth examples could be effected by the employment of two separate transformers or by a single apparatus consisting of a magnetic circuit linked with three windings $P_1$ $P_2$ and C, as shown in Fig. 8, the first traversed by the motor current, the second connected with the mains and the third having the same function as the windings $f_3$ or $f_5$ in Figs. 3 and 4 and Fig. 6 respectively.

Although the preceding description has related more particularly to stabilizing the braking action, it is to be remarked that all the described arrangements may also be employed to render the current more constant during the starting period, it being understood that the direction of some of the windings must be changed, this being a matter readily undertaken by a qualified electrical engineer. Further, the same arrangements would have an advantageous action in reducing shocks which would be felt by the travelers at the moment of establishing or breaking the circuit.

In the specification of the patent application Serial No. 702,074, previously mentioned it has been set forth that the system there described would insure starting and braking at constant current strength. It is the ampere-turns of the winding H which determine the value of this current. Now, it will be seen that if, by some means, different values can be given to these ampere-turns, corresponding different values will be obtained for the constant current without any other features of the machine undergoing any change.

The switch 4 shown in Fig. 7 provides means for giving different values to the ampere turns of the winding H as required. In the position of the switch shown it will be seen that all the turns of the winding are in circuit. If, however, the switch be turned so that its contact members move on to the next contacts of the outer row, a portion of the winding will be cut out. A further movement will cut out a second portion and so on. This method of working will be useful more particularly for traction working under certain conditions; for example, in the starting period or in normal running, in order to overcome steep gradients, or during the braking period in order to obtain emergency stops.

Mention has been made above of the winding H, but it is evident that if a small machine $f$ (see Fig. 2) is substituted for this winding, the desired result could be obtained by fixing different values for the ampere-turns of the winding $h$.

In the specification of the application Serial No. 702,074, previously mentioned, it is set out that the current traversing the winding E varies at the same time as the voltage at the terminals of the motors $M_1$ and $M_2$. These variations according to the said specification, proceed in a continuous manner up to the conditions of series or of parallel working of the motors, and commence again at the moment of the establishment of the braking conditions. Now, if by suitable means—for instance by means of the switch 5 (Fig. 7)—the variation of the current traversing the winding E is interrupted at any moment, this winding no longer being a shunt winding, but becoming separately excited, for instance by the battery 16, so that the strength of its field current is fixed, it is evident that by this means a speed may be obtained which may be different from the series speed or the parallel speed, for, by working in this manner the motors $M_1$ and $M_2$ have applied to them a constant voltage different from half or full line voltage. This method of working would even permit the obtaining of speeds beyond the limit determined by the line voltage by supplying these motors at a fixed voltage higher than that of the line. This arrangement would also find application during the braking period, especially on down grades.

A change in the functioning of the winding E as above described may be effected by means of the switch 5, which when in the position shown connects the winding across the brushes $e'$ $e^2$ for normal working. By moving the switch to the lower position the winding may be disconnected from the main circuit and connected with a separate circuit containing the battery 16 or other source of current of approximately constant voltage.

The invention has particular relation to traction working with series motors. At the same time it does not exclude the use of shunt or compound motors, or motors having any combination of excitation windings.

I declare that what I claim is:

1. An electric system comprising in combination a motor, mains, connections between the terminals of said motor and the mains, a rotatable machine comprising an armature having a pair of brushes connected in series with the motor, and a field system acting on the armature winding between the said brushes, means for varying the excitation of said field system, said means being controlled by the voltage drop in the motor, and means for bringing the variation of the said excitation approximately into phase with the variations of said voltage drop.

2. An electric system comprising in combination a motor, mains, connections between the terminals of said motor and the mains, a rotatable machine comprising an armature having a pair of brushes connected in series with the motor, a field system acting on the armature winding between said brushes, means for applying an excitation of fixed value to said field system, means for applying an excitation of variable value to said field system, the last mentioned means being controlled by the voltage drop in the motor, and means for bringing the variations of the excitation approximately into phase with the variations in voltage drop.

3. An electric system comprising in combination a motor, mains, connections between said motor and said mains, a rotatable armature, a pair of brushes on said armature connected in series with the motor, a field system acting on the winding on said armature between said brushes, a composite excitation system acting on said field system and comprising means for applying a component excitation of constant value, means for applying a component excitation varying in direct relation to the variations of voltage drop in the motor, and means for applying an additional component excitation during the said variations.

4. An electric system comprising in combination a motor, mains, connections between said motor and said mains, a rotatable armature, a pair of brushes on said armature connected in series with the motor, a field system acting on the winding on said armature between said brushes, a composite excitation system acting on said field system and comprising means for applying an excitation proportional to the voltage between the said brushes, a magnetic circuit independent of said field system, means for exciting said magnetic circuit with variable excitation, and a winding linked with said magnetic circuit and connected electrically with the excitation system acting on the said field system so as to apply a component excitation thereto.

5. An electric system comprising in combination a motor, mains, connections between said motor and said mains, a rotatable armature, a pair of brushes on said armature connected in series with the motor, a field system acting on the winding on said armature between said brushes, a composite excitation system acting on said field system and comprising means for applying a component excitation of variable value, means for automatically producing variations in the value of this excitation, means for applying a second component excitation, and means for producing at will change of this last mentioned excitation from one fixed value to another.

6. An electric system comprising in combination a motor, mains, connections between said motor and said mains, a rotatable armature, a pair of brushes on said armature connected in series with the motor, a field system acting on the winding on said armature between said brushes, a composite excitation system acting on said field system and comprising means for applying a component excitation of fixed value, means for applying a component excitation which will be automatically variable in value, and means for rendering fixed at will the value of said second component excitation.

7. An electric system comprising in combination an electric circuit containing a device working with variable voltage, a rotary apparatus connected with said circuit, means for producing two component excitations of a magnetic circuit in said rotary apparatus, one of said excitations being of fixed value and the other of said excitations being of variable value under the influence of the variable voltage of the said device, and means for bringing the variation of the said component excitation approximately into phase with the variations of the said voltage.

8. An electric system comprising an electric circuit, a device working with variable voltage in said circuit, a rotary apparatus connected with said circuit and generating an electro-motive force, means for producing two component excitations of a magnetic circuit in said rotary apparatus, one of said excitations being of fixed value and the other of said excitations being of variable value under the influence of the variable voltage of the said device, and means for determining the relative values of the time of response to current variations of the rotary apparatus and of the rest of the circuit.

9. An electric system comprising an electric circuit containing a device working with variable voltage in said circuit, a rotary apparatus connected with said circuit and generating an electro-motive force, means for producing two component excitations of a magnetic circuit in said rotary apparatus, one of said excitations being of fixed value and the other of said excitations being of variable value under the influence of the variable voltage of the said device, inductive means for determining the relative values of the time of response to current variations of the rotary apparatus and of the rest of the circuit.

10. An electric system comprising in combination an electric circuit, a series motor arranged in said circuit, a rotary apparatus connected with said circuit, and generating an electro-motive force, means for producing two component excitations of a magnetic circuit in said rotary apparatus, one of said excitations being of fixed value and the other of said excitations being of variable value under the influence of the counter-electro-motive force of the motor, means for determining the relative values of the time of response to current variations of the rotary apparatus and of the part of the circuit external to said apparatus and containing said motor.

11. An electric system comprising in combination an electric circuit, a series motor arranged in said circuit, a rotary apparatus connected with said circuit and generating an electro-motive force, means for producing two component excitations of a magnetic circuit in said rotary apparatus, one of said excitations being of fixed value and the other of said excitations being of variable value under the influence of the counter-electromotive force of the motor, inductive means for determining the relative values of the time of response to current variations of the rotary apparatus and of the part external to said apparatus and containing said motor.

12. An electric system comprising in combination an electric circuit, a series motor in said circuit, a rotary apparatus connected with said circuit and generating an electromotive force between brushes on it which are connected with the circuit, an exciting winding having a fixed value for its ampere turns mounted on said rotary apparatus, a second exciting winding on said apparatus connected across the brushes thereon and varying in value under the influence of the varying potential difference applied to said brushes, and means for determining the relative values of the time of response to current variations of said second excitation and the circuit external to said machine.

13. An electric system comprising in combination an electric circuit, a series motor in said circuit, a rotary apparatus connected with said circuit and generating an electromotive force, two windings for exciting said rotary apparatus one of them being supplied with a current of fixed value and the other with a current of variable value dependent on the counter electromotive force of the motor, an electrically conducting coil arranged to form a circuit inductively connected with the exciting winding of the said motor, and means whereby said electrically conducting coil can determine the relative values of the time of response to current variations of said rotary apparatus and said motor.

14. An electric system comprising in combination an electric circuit, a series motor in said circuit, a rotary apparatus connected with said circuit and generating an electromotive force, two windings for exciting said rotary apparatus, one being supplied with current of fixed value and the other with current of variable value dependent on the counter electro-motive force of the motor, and a self-induction coil connected in said circuit externally to the rotary apparatus.

15. An electric system comprising in combination an electric circuit, a device working with variable voltage connected in said circuit, a rotatable armature, a pair of brushes on said armature connected in series with said device, a field system acting on the winding of said armature between said brushes, a composite excitation acting on said field system comprising means for applying an excitation proportional to the voltage between said brushes, a transformer the primary winding of which is connected in the electric circuit in series with the brushes on said armature and the secondary winding of which is connected with the said excitation system so as to apply a component excitation thereto when the current in the main circuit varies.

In witness whereof, I have hereunto signed my name this 22d day of November, 1912, in the presence of two subscribing witnesses.

FERNAND CUMONT.

Witnesses:
 OLPHONSE MÉJEAN,
 HANSON C. COXE.